(12) United States Patent
Rodrigues Rosa (10) Patent No.: US 10,459,825 B2
(45) Date of Patent: Oct. 29, 2019

(54) INTELLIGENT EXPANSION OF SYSTEM INFORMATION COLLECTION

(71) Applicant: Red Hat, Inc., Raleigh, NC (US)

(72) Inventor: Cleber Rodrigues Rosa, Manchester, NH (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 15/680,806

(22) Filed: Aug. 18, 2017

(65) Prior Publication Data

US 2019/0057018 A1    Feb. 21, 2019

(51) Int. Cl.

| G06F 21/62 | (2013.01) |
|---|---|
| *G06F 9/44* | (2018.01) |
| *G06F 13/00* | (2006.01) |
| *G06F 11/36* | (2006.01) |
| *G06F 8/60* | (2018.01) |

(Continued)

(52) U.S. Cl.
CPC ........ *G06F 11/3664* (2013.01); *G06F 11/368* (2013.01); *G06F 8/443* (2013.01); *G06F 8/60* (2013.01); *G06F 9/44521* (2013.01); *G06F 11/3457* (2013.01); *G06F 11/3612* (2013.01); *G06F 21/6218* (2013.01)

(58) Field of Classification Search
CPC ........ G06F 21/6218; G06F 9/30; G06F 9/455; G06F 9/30167; G06F 9/44521; G06F 9/3009; G06F 8/443; G06F 8/60; G06F 8/65; G06F 8/71; G06F 8/4442; G06F 11/3612; G06F 11/3457; G06F 11/3688; G06F 11/368; G06F 11/3604; G06F 11/3672

See application file for complete search history.

(56) References Cited

U.S. PATENT DOCUMENTS 5,822,787 A * 10/1998 Zucker ................ G06F 9/44521
                                                            711/213
5,854,924 A * 12/1998 Rickel ................ G06F 11/3604
                                                            717/132

(Continued)

FOREIGN PATENT DOCUMENTS

CN           106850330 A      6/2017

OTHER PUBLICATIONS

Laune C. Harris et al., Practical Analysis of Stripped Binary Code, Dec. 2005, [Retrieved on Jun. 20, 2019]. Retrieved from the internet: <http://delivery.acm.org/10.1145/1130000/1127590/p63-harris.pdf> 6 Pages (63-68) (Year: 2005).*

(Continued)

*Primary Examiner* — Anibal Rivera
(74) *Attorney, Agent, or Firm* — Haynes and Boone LLP (57) ABSTRACT

Methods, systems, and computer program products are provided for dynamically collecting information corresponding to characteristics of a binary. A user or program inputs a path corresponding to a binary. A testing framework accesses a testing configuration that specifies one or more characteristics of a binary for which data collection is enabled. The testing configuration parses the binary to collect the characteristics. Based on the collected characteristics, the testing configuration identifies additional characteristics of the binary. The testing configuration collects information corresponding to identified additional characteristics of the binary.

20 Claims, 6 Drawing Sheets

(51) Int. Cl.
  *G06F 8/41* (2018.01)
  *G06F 9/445* (2018.01)
  *G06F 11/34* (2006.01)

(56) References Cited

U.S. PATENT DOCUMENTS

| | | | | |
|---|---|---|---|---|
| 5,912,851 | A * | 6/1999 | Matsuoka | G11C 29/34 |
| | | | | 365/189.07 |
| 7,047,394 | B1 * | 5/2006 | Van Dyke | G06F 9/30167 |
| | | | | 703/26 |
| 7,080,356 | B2 * | 7/2006 | Atallah | G06F 8/71 |
| | | | | 707/999.009 |
| 7,321,885 | B2 | 1/2008 | Loh | |
| 7,496,904 | B2 * | 2/2009 | Srivastava | G06F 11/368 |
| | | | | 717/133 |
| 7,873,945 | B2 * | 1/2011 | Musuvathi | G06F 11/3688 |
| | | | | 717/104 |
| 9,116,874 | B2 | 8/2015 | Ueda | |
| 9,639,453 | B2 | 5/2017 | Belur | |
| 2003/0229890 | A1 * | 12/2003 | Lau | G06F 8/65 |
| | | | | 717/168 |
| 2004/0054946 | A1 * | 3/2004 | Atallah | G06F 8/60 |
| | | | | 714/38.14 |
| 2004/0054988 | A1 * | 3/2004 | Atallah | G06F 8/71 |
| | | | | 717/122 |
| 2004/0054990 | A1 * | 3/2004 | Liao | G06F 8/4442 |
| | | | | 717/124 |
| 2004/0054992 | A1 * | 3/2004 | Nair | G06F 8/443 |
| | | | | 717/138 |
| 2004/0154001 | A1 * | 8/2004 | Haghighat | G06F 11/3688 |
| | | | | 717/130 |
| 2004/0154019 | A1 * | 8/2004 | Aamodt | G06F 9/3009 |
| | | | | 718/102 |
| 2005/0091648 | A1 * | 4/2005 | Dick | G06F 7/764 |
| | | | | 717/130 |
| 2005/0125777 | A1 * | 6/2005 | Calder | G06F 11/3457 |
| | | | | 717/131 |
| 2006/0080635 | A1 * | 4/2006 | Anwar | G06F 9/44521 |
| | | | | 717/100 |
| 2006/0080648 | A1 * | 4/2006 | Anwar | G06F 9/44521 |
| | | | | 717/163 |
| 2006/0080680 | A1 * | 4/2006 | Anwar | G06F 9/44521 |
| | | | | 719/328 |
| 2006/0080681 | A1 * | 4/2006 | Anwar | G06F 9/44521 |
| | | | | 719/331 |
| 2006/0080682 | A1 * | 4/2006 | Anwar | G06F 9/44521 |
| | | | | 719/331 |
| 2006/0080683 | A1 * | 4/2006 | Anwar | G06F 9/44521 |
| | | | | 719/332 |
| 2006/0168491 | A1 * | 7/2006 | Lee | G11C 29/02 |
| | | | | 714/733 |
| 2009/0007077 | A1 * | 1/2009 | Musuvathi | G06F 11/3688 |
| | | | | 717/130 |
| 2010/0185899 | A1 * | 7/2010 | Chen | G06F 11/2221 |
| | | | | 714/42 |
| 2010/0287534 | A1 * | 11/2010 | Vangala | G06F 11/3612 |
| | | | | 717/124 |
| 2012/0219209 | A1 * | 8/2012 | Shotton | G06K 9/00335 |
| | | | | 382/159 |
| 2013/0086369 | A1 * | 4/2013 | Blainey | G06F 8/443 |
| | | | | 712/226 |
| 2014/0258717 | A1 * | 9/2014 | Baek | G06F 21/6218 |
| | | | | 713/165 |
| 2015/0212802 | A1 * | 7/2015 | McFarlane | G06F 8/443 |
| | | | | 717/158 |
| 2016/0306690 | A1 | 10/2016 | Underseth et al. | |
| 2016/0314064 | A1 | 10/2016 | Moretto et al. | |
| 2016/0371065 | A1 * | 12/2016 | Venkatasubramanian | |
| | | | | G06F 9/30 |
| 2018/0004637 | A1 * | 1/2018 | Chandra | G06F 11/3672 |

OTHER PUBLICATIONS

Wissam Mallouli et al., VDC-Based Dynamic Code Analysis: Application to C Programs, 2011, [Retrieved on Jun. 20, 2019]. Retrieved from the internet: <https://pdfs.semanticscholar.org/22d3/c922c27ae83d79fca98260760c7a7d4c3a55.pdf> 17 Pages (4-20) (Year: 2011).*

Sheppard, John W., et al., "An Integrated View of Test and Diagnostic Information Standards", ARINC Engineering Services, LLC; NSWC Corona Division, 11 pgs. (2002).

"Utilites APIs" http://avocado-framework.readthedocs.io/en/51.0/api/utils/avocado.utils.html, 63 pgs. (2014-2015).

Abe, T., et al., "Development of 'Information Collection and Delivery Sensor Base System' for Large-Scale Power Systems", IEEE Transactions on Power Deliveryt, vol. 7, No. 1, 3 pgs. (1992).

Lian, Hang, et al., "Research on Static Comprehensive Detection Method for Mission Eiectronic System", School of Computing Beihang University Beijing, China, 5 pgs. (2013).

* cited by examiner

INTELLIGENT EXPANSION OF SYSTEM INFORMATION COLLECTION

FIELD OF DISCLOSURE

The present disclosure relates generally to data processing and software development, and more specifically to computer program testing and debugging.

BACKGROUND

Conventional test runners and frameworks exist that allow users to set up a test execution environment to statically collect and obtain system information. Conventional test runners include libraries that contain and execute unit tests, and record the results of the tests. Conventional test frameworks include systems for automating tests. The collected system information from the test runners and test frameworks are used during software development to aid in the interpretation of test results from tests that have been run on the system. For example, a software failure related to a lack of storage space could be investigated by executing an application to record system information about storage devices. The collection of the information about storage devices could be performed by a user entering a command to execute the application and recording the output of the command.

Test runners and frameworks can automate execution of tests to eliminate some repetitive tasks. For example, a test automation interface can provide a workspace that includes a graphical user interface and scripts with which a user can interact to perform software testing. User can manipulate graphical features of the workspace to configure and run software tests.

Software testing generally involves executing different software or system components in order to evaluate different properties of interest, such as efficiency, the correct response to input, or whether the system can run in the users preferred environment. A typical error that testing may expose is a coding error, but there may be other issues, such as environmental issues as well. There are different styles of software testing, such as unit testing, integration testing, and system testing. Unit testing is performed on particular sections of software code. Integration testing focuses on making sure the interfaces of different components is verified. Finally, system testing is performed to make sure that the system meets its requirements.

SUMMARY

A system of one or more computers can perform particular operations or actions by virtue of having software, firmware, hardware, or a combination thereof installed on the system that in operation causes or cause the system to perform the actions. One or more computer programs can perform particular operations or actions by virtue of including instructions that, when executed by data processing apparatus, cause the apparatus to perform the actions. One general aspect includes a method including: inputting, into a testing framework, a path corresponding to a binary; accessing, by the testing framework, a testing configuration corresponding to the binary, the testing configuration specifying one or more characteristics of the binary for which data collection is enabled; parsing the binary to collect the specified one or more characteristics, the collected specified one or more characteristics including dynamic library data and symbol table data corresponding to the binary; identifying, based on the collected specified one or more characteristics, additional characteristics of the binary; and collecting information corresponding to the identified additional characteristics of the binary. Other examples of this aspect include corresponding computer systems, apparatus, and computer programs recorded on one or more computer storage devices, each to perform the actions of the methods.

One general aspect includes a non-transitory machine-readable medium having stored thereon machine-readable instructions executable to cause a machine to perform operations including: inputting, into a testing framework, a path corresponding to a binary; accessing, by the testing framework, a testing configuration corresponding to the binary, the testing configuration specifying one or more characteristics of the binary for which data collection is enabled; parsing the binary to collect the specified one or more characteristics, the collected specified one or more characteristics including dynamic library data and symbol table data corresponding to the binary; identifying, based on the collected specified one or more characteristics, additional characteristics of the binary; and collecting information corresponding to the identified additional characteristics of the binary. Other examples of this aspect include corresponding computer systems, apparatus, and computer programs recorded on one or more computer storage devices, each to perform the actions of the methods.

One general aspect includes a computing system including: a non-transitory memory storing a testing framework, one or more hardware processors coupled to the non-transitory memory and that execute instructions to cause the system to perform operations including inputting, into the testing framework, a path corresponding to a binary. The operations also include accessing, by the testing framework, a testing configuration corresponding to the binary, the testing configuration specifying one or more characteristics of the binary for which data collection is enabled. The operations also include parsing the binary to collect the specified one or more characteristics, the collected specified one or more characteristics including dynamic library data and symbol table data corresponding to the binary. The operations also include identifying, based on the collected specified one or more characteristics, additional characteristics of the binary. The operations also include collecting information corresponding to the identified additional characteristics of the binary. Other examples of this aspect include corresponding computer systems, apparatus, and computer programs recorded on one or more computer storage devices, each to perform the actions of the methods.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make art example non-functional.

It is advantageous for a test execution environment to collect all relevant information corresponding to execution of a binary so that software developers can identify and correct failures. Setting up a test execution environment so that all possible relevant information is collected is a cumbersome and time consuming process. Software developers who use test execution environments are required to have a deep knowledge of which features they would like to have tested, even before a test has actually run. Furthermore, traditional test runners and framework carry a lot of information to help a developer detect if there is a failure, which is time consuming for a developer to try to parse through in order to detect why the failure occurred. Furthermore, the developer may not be able to determine how the system environment changed as the tests were executed. Additionally, saving all of the information from the execution of the tests not only uses up the developers time to review all of the information, but also uses up system resources. Moreover, usually the execution of a test is configured with a static list of data to be collected. This does not provide the opportunity for the tests to dynamically adapt, depending on the features of the binary itself and the results of the tests as the tests are executed.

The techniques described herein provide solutions to the problems described above with respect to traditional testing runners and frameworks. The techniques provide dynamic collection data by parsing the binary for a first set of specified initial characteristics. The data that is gathered for these initial characteristics is analyzed and used to determine further characteristics to be gathered before, during, and/or after executing the binary. Accordingly, the techniques gather testing data in a dynamic manner, based on features of the particular binary that is being tested. As described herein, techniques that address the problem outline above allow users/software developers to utilize testing framework to collect relevant information on the binary and its system environment.

As a result of the techniques described herein, relevant testing information is efficiently collected. The amount of user work to configure to perform particular tests is reduced because the testing framework is able to dynamically determine additional tests to perform based on characteristics of the binary that are identified during testing. This provides time savings for users, resulting in greater efficiency. Moreover, by dynamically determining and collecting relevant testing information, system resources can be preserved by avoiding the collection of irrelevant information. These features greatly improve the efficiency of users because the users have fewer testing results to review. Further, the efficiency of the computing systems used to perform the testing is also improved, as certain tests may be avoided, resulting in processing /m network, and/or storage resource savings. Furthermore, additional insights may be provided regarding when and where failure happen, as well as how the system changed as the tests progressed, thus allowing for improvements to software development efforts.

Figure 1:
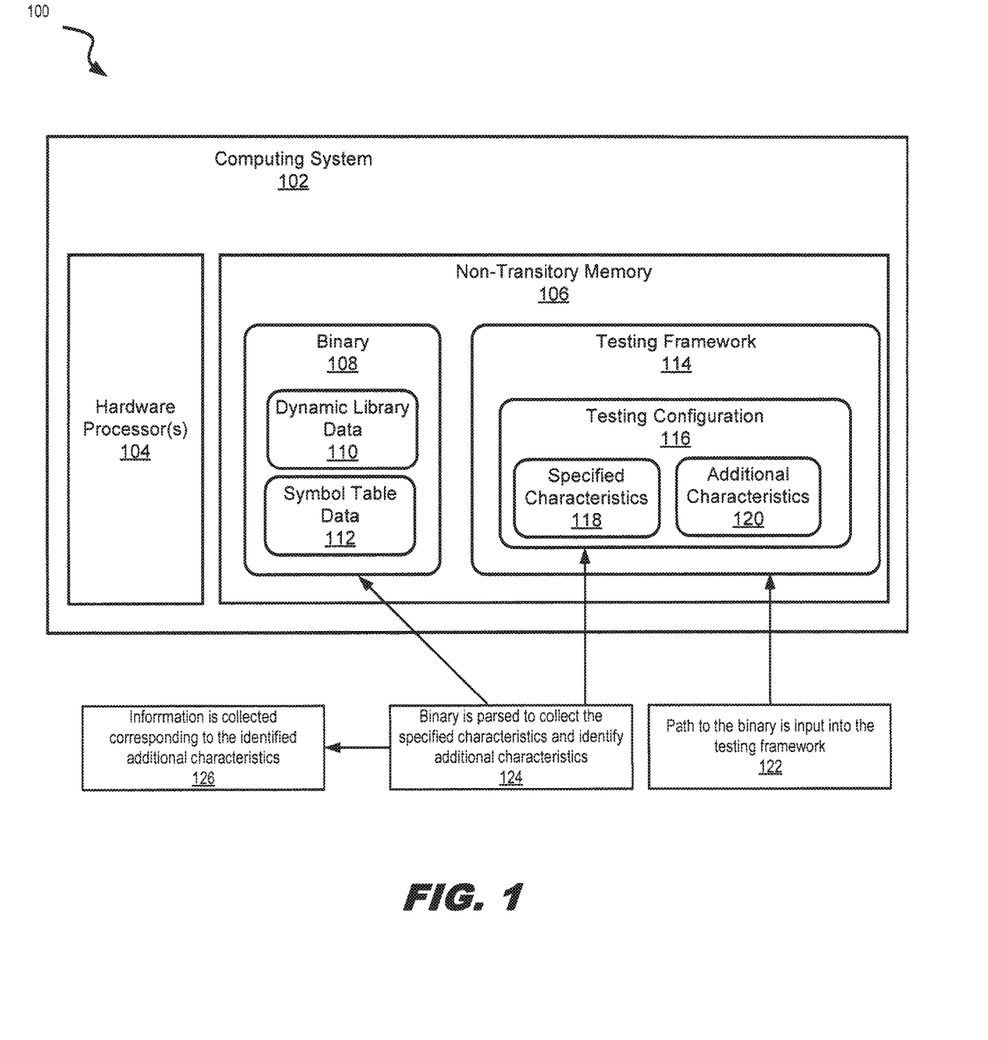
FIG. 1 is an organizational diagram illustrating a system that provides a testing framework, in accordance with various examples of the present disclosure.

FIG. 1 is an organizational diagram illustrating a system 100 that provides a testing framework, in accordance with various examples of the present disclosure.

The system 100 includes a computing system 102. In the present example, the computing system 102 is structured as a computing device, such as a desktop computer, laptop computer, rack mount computer, handheld/mobile computing device, or other computing device. The computing system 102 may include any collection of machines that individually or jointly execute a set (or multiple sets) of instructions to perform any one or more of the methodologies discussed herein. For example, a collection of machines the computing system 102 may be communicatively coupled via one or more network devices and/or transport media.

The computing system 102 is structured with hardware, which includes physical elements such as one or more hardware processors (e.g., hardware processor(s) 104) and one or more non-transitory memory devices (e.g., non-transitory memory 106). In more detail regarding the hardware processor 104, the hardware processor 104 is structured to include one or more general-purpose processing devices such as a microprocessor, central processing unit (CPU), and the like. More particularly, the hardware processor 104 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the hardware processor 104 is structured to include one or more special-purpose processing devices such as an application specific integrated circuit (ASIC), a field programmable gate array (FPGA), a digital signal processor (DSP), network processor, and so forth. The hardware processor executes instructions for performing the operations, steps, and actions discussed herein.

In more detail regarding the non-transitory memory 106, the non-transitory memory 106 is structured to include at least one machine-readable storage medium on which is stored one or more set of instructions (e.g., software) including any one or more of the methodologies or functions described herein. The non-transitory memory 106 may be structured to include one or more of a read-only memory (ROM), flash memory, dynamic random access memory (DRAM) such as synchronous DRAM (DFRAM), double data rate (DDR SDRAM), or DRAM (RDRAM), and so forth, static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in the non-transitory memory 106 that are executable by the hardware processor 104.

The non-transitory memory 106 is structured to store at least one binary 108 that includes dynamic library data 110 and symbol table data 112. A binary may include one or more executable files, object files, programs, and/or applications, and may be structured in an Executable and Linkable Format (ELF) (formerly called the Extensible Linking Format). Dynamic library data 110 may include, for example, object code and/or addresses to symbols within a particular object. Symbol table data 112 may include, for example, the addresses of global variables, the function of a particular variable, whether a symbol is a free or bound variable, and the identification of the variable's namespace.

The non-transitory memory 106 is also structured to store at least one testing framework 114 that includes a testing configuration 116. The testing configuration 116 may be created, for example, by a software developer by inputting pre-defined tests or defining new tests to apply in the testing framework. The tests are configured to capture specified characteristics 118 corresponding to the binary 108, such as at least a portion of the dynamic library data 110 and at least a portion of the symbol table data 112. Moreover, the tests are configured to access the specified characteristics 118 to determine additional characteristics 120, which may include portions of the dynamic library data 110 or symbol table data 112 and other information not included in the specified characteristics 118.

In some examples, the additional characteristics 120 that are determined include characteristics that are identified from the dynamic library data 110, such as the identifiers and/or addresses of dynamically linked shared libraries that are loaded by the binary, in some examples, the additional characteristics 120 that are identified include characteristics that are identified from the symbol table data 112, such as identifiers and memory locations of variables that are used to store data values of the binary during its execution. In some examples, the additional characteristics 120 that are identified include characteristics that are identified from the dynamic library data 110 and/or symbol table data 112, such as indications of system services accessed by the binary, including networking and data storage system services.

The testing framework allows a user to perform an action 122 to input a path to the binary in the testing framework 114. For example, a user may trigger the loading of the binary using a command line interface or graphical user interface. In other examples, loading of the binary may be triggered by another program.

Once the path to the binary is received by the testing framework 114, the testing configuration 116 corresponding to the binary 108 is identified. The testing configuration 116 that is configured for the binary specifies one or more characteristics of the binary 108 for which data collection is enabled. In some examples, the testing configuration 116 may include a global profile that includes a particular testing configuration 116 that is applied to a plurality of binaries. In some examples, the global profile of the testing configuration 116 may be applied to the binary if a custom profile has not been configured for the binary. By way of further example, the testing configuration 116 may include a profile that has been customized by the user for one or more particular binaries. Accordingly, if there is a customized profile for a binary, that customized profile may be applied to that binary instead of the global profile.

The testing configuration 116 causes action 124 to be performed to parse the binary 108 to collect the specified characteristics and identify additional characteristics 120.

The collected specified one or more characteristics 118 may include dynamic library data 110 and symbol table data 112 that correspond to the binary 108. The additional characteristics 120 that are identified may include any particular features that are gathered based on the specified characteristics 118.

The additional characteristics 120 may cause other tests from the testing framework to be initiated, depending on the result or type of the additional characteristic 120. By way of further example, the additional characteristics 120 may then be used as parameters for other tests initiated by the testing framework.

The testing configuration 116 causes action 126 to be performed to collect information corresponding to the identified additional characteristics 120 of the binary 108. For example, the information that is collected corresponding to the identified additional characteristics 120 of the binary 108 may be results of tests that were dynamically initiated during the execution of the binary. Examples of the information collected at action 126 includes information collected before, during, and/or after execution of the binary such as system environment information (e.g., operating system version number, installed packages, and so forth), data values of the binary's variables at different execution times, identifiers of logical volumes accessed by the binary to store data, mappings between logical and physical extents, configuration information regarding logical volumes, the binary's exit status (including identifying whether the binary successfully was successfully executed, and indicating any errors during execution), and so forth.

Figure 2:
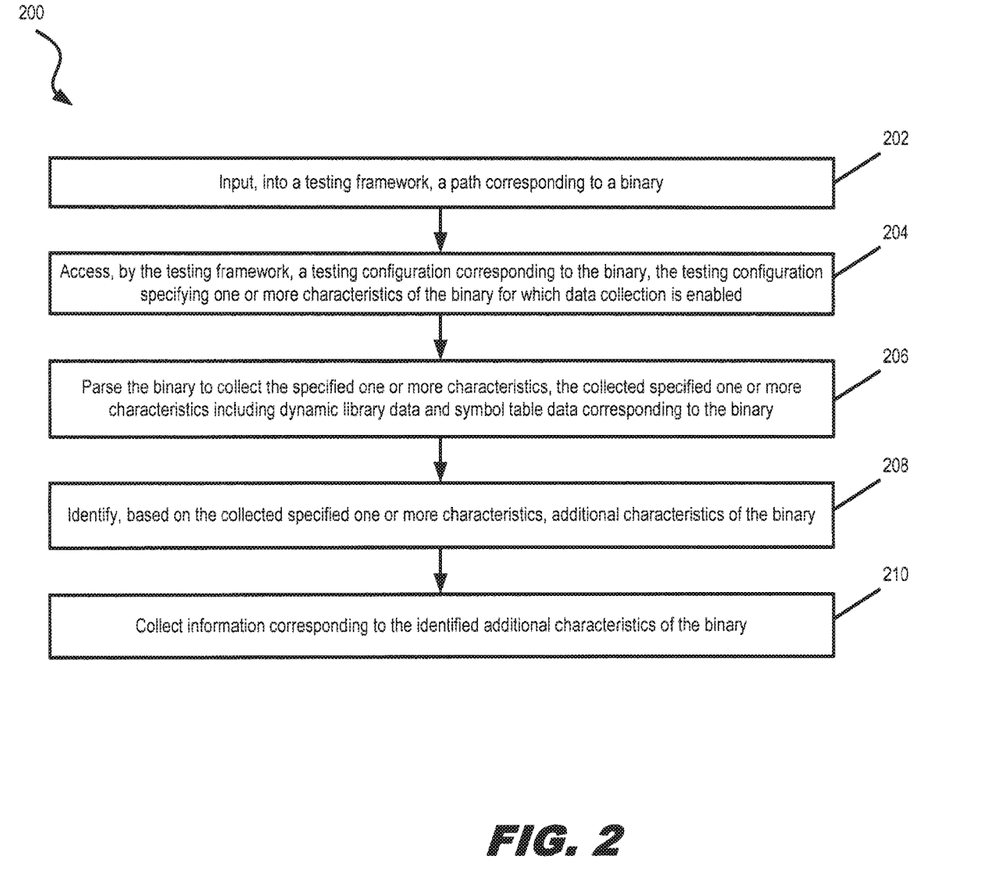
FIG. 2 is a flow diagram illustrating a method performed by a testing framework to collect characteristics corresponding to a binary, in accordance with various examples of the present disclosure.

FIG. 2 is a flow diagram 200 illustrating a method performed by a testing framework to collect characteristics corresponding to a binary, in accordance with various examples of the present disclosure. In some examples, the method is performed by executing computer-readable instructions that are stored in a non-transitory memory using one or more processors. The non-transitory memory and processors may be provided by, for example, the hardware described with respect to FIG. 1. For example, the method may be performed by the computing system 102 that is described in further detail with respect to FIG. 1.

At action 202, a user and/or program inputs a path, which specifies the unique location in a file system corresponding to a binary a testing framework. For example, the path may include a file name of the binary plus identifiers of the directories containing the file. For example, a user may input the path to the binary by typing the path into a command line interface or by selecting a graphical icon corresponding to the binary via a graphical user interface. In other examples, loading of the binary may be triggered by another program, by pre-configuring the program with the path to the binary and then executing the program.

At action 204, the testing framework accesses a testing configuration corresponding to the binary. The testing configuration specifies one or more characteristics of the binary for which data collection is enabled. In some examples, the testing configuration specifies whether to collect symbol table data and/or dynamical library data corresponding to the binary. In other examples, the testing configuration specifies particular variables of the binary for which data collection is enabled. The variables of the binary, symbol table data, and dynamic library data are all examples of specified characteristics of the binary for which data collection is enabled. All of these examples, or a subset of these examples, may be specified as characteristics for which data collection is enabled.

In some examples, the testing configuration may include a global profile that includes a particular testing configuration that is applied to a plurality of binaries. The testing configuration specifies which characteristics of the binary are enabled for data collection. As an example, generally it may be beneficial to collect both symbol table data and dynamic library data. Accordingly, the global profile may include a configuration that both symbol table data and dynamic library data are collected. The global profile of the testing configuration may be applied to binaries by default if a custom profile has not been configured for the binaries.

In some examples, user may determine that it is beneficial to collect only a subset of data, rather than performing all available tests. For example, a user may identify that it is beneficial to collect symbol table data for one or more particular binaries, and not to also collect dynamic library data for these binaries. Accordingly, the user may configure the testing configuration to include profile that has been customized by the user for one or more particular binaries to collect only the symbol table data. If there is a customized profile for a binary, the testing configuration may identify the customized profile that corresponds to the particular binary, and thus apply the customized profile to that binary instead of the global profile. In some examples, the customized profile may be identified by matching the input file path with metadata corresponding to the customized profile. Global and customized profiles of a testing configuration are described in further detail with respect to FIG. 4.

At action 206, the testing framework parses the binary to collect the specified one or more characteristics. As discussed above, which characteristics are specified may depend on the particular configuration of the global or customized profile for the binary. In the present example, the collected specified one or more characteristics include dynamic library data and symbol table data corresponding to the binary. Accordingly, in this example, the parsing of the binary includes collecting the symbol table data from a symbol table included in the binary and also collecting the dynamic library data from the binary.

At action 208, based on the collected specified one or more characteristics, the testing framework identifies additional characteristics of the binary. For example, identifying the additional characteristics may include determining, based on specified symbol table data and/or dynamic library data, that the binary interacts with at least one system service, such as a networking system service or a data storage service. In some examples, a data storage service provides one or more logical volumes to store data corresponding to the binary. In another example, identifying the additional characteristics may include identifying identifiers of one or more dynamically linked libraries from the dynamic library data. In other examples, identify the additional characteristics may include identifying variables of the binary based on the symbol table data. Other additional characteristics may include characteristics collected from the system environment, such as by identifying software packages that are installed on the system, versions of the operating system and/or other applications, and so forth. These are all examples of additional characteristics that can be determined from data collected based on the initial specified characteristics. Other additional characteristics may be collected as well, instead of or in addition to these examples provided herein.

At action 210, the testing framework collects information corresponding to the identified additional characteristics of the binary. For example, the collected information may include binary and/or system environment information before, during, and/or after the binary is executed. For example, the collecting of information corresponding to the identified additional characteristics may include collecting one or more data values corresponding to the one or more identified variables of the binary. These data values may be collected at different points during execution of the binary to identify changes that occurred during processing. By way of further example, system environment information may be collected before the binary is executed and after the binary is executed in order to perform a comparison of the system environment and how the system environment changed as the testing progressed.

In other examples, the exit status of the binary and any errors that occurred during processing may be identified, and information may be provided regarding these errors based on identified characteristics of the binary. For example, if an additional characteristic of the binary is identified as being that the binary uses a storage service, an error relating to storage space may result in the testing framework collecting further information regarding the identified storage service. Similarly, a networking service error may cause the testing framework to collect further information regarding the networking service. Accordingly, the testing information that is collected is dynamically tailored to the particular characteristics specified by the testing configuration and the additional characteristics that are determined by the testing framework.

Figure 3:
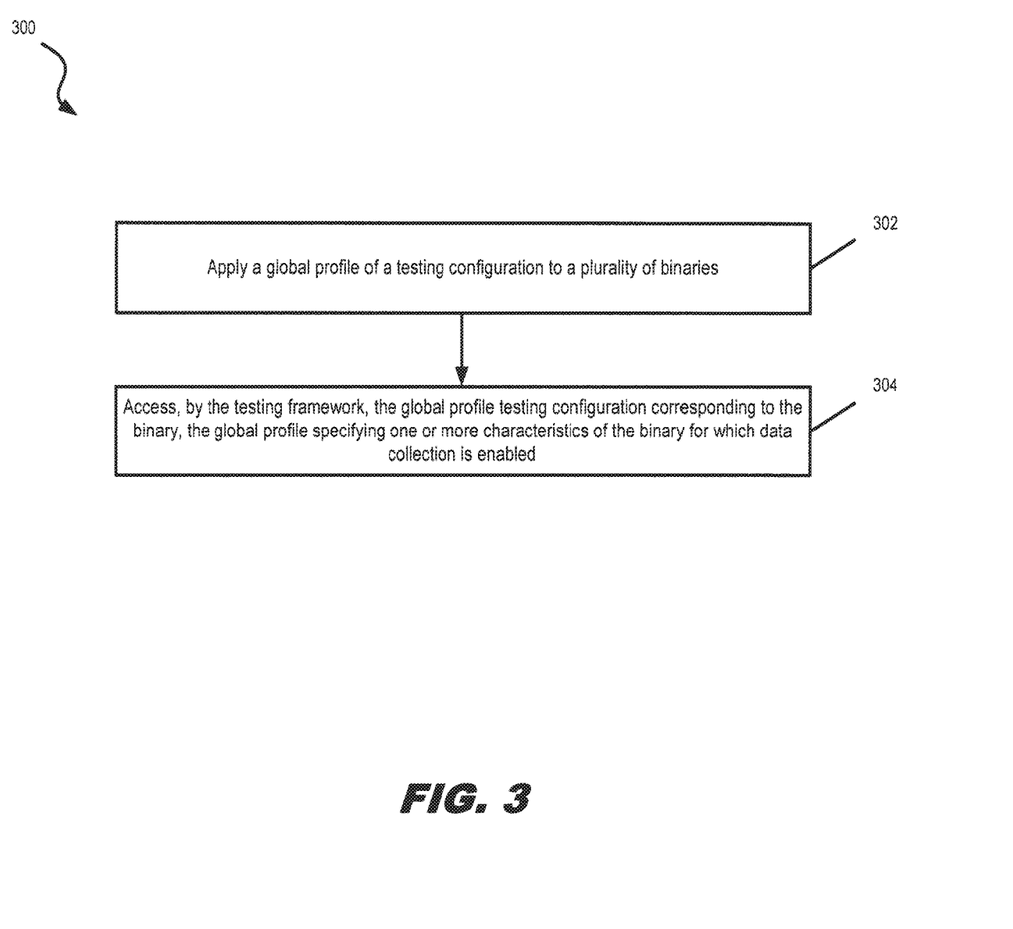
FIG. 3 is a flow diagram illustrating a testing configuration having a global profile, in accordance with various examples of the present disclosure.

FIG. 3 is a flow diagram 300 illustrating a testing configuration having a global profile, in accordance with various examples of the present disclosure. The examples provided regarding FIG. 3 may be performed within the context of the actions 202, 204, 206, 208, and 210 that are performed with respect to FIG. 2. Actions 302 and 304 that are described herein provide further detail and examples regarding actions that may be performed during action 204 that is described with respect to FIG. 2.

At action 302, a testing configuration applies a global profile to a plurality of binaries. In this example, the global profile is a default profile applied by default to all binaries. In this example, the default profile applies all pre-configured tests to the binaries. The global profile may be customized by a user to change which pre-configured tests are applied. In other examples, a testing profile may be customized to perform particular tests for one or more binaries that are different from the tests specified by the global profile, such that the customized profile is applied to the one or more binaries rather than the global profile.

At action 304, in the present example, a customized profile has not been configured for the binary, and so the testing framework accesses a global profile and applies the testing configuration of the global profile to the binary. In some examples, the testing framework accesses the global profile by matching it to the binary, and applies the testing configuration of the global profile by reading the specified characteristics from the global profile. In some examples, the profile may include the specified characteristics as one or more text entries. By way of further example, the applying of the global profile may include reading one or more file names and/or commands from the global profile.

Figure 4:
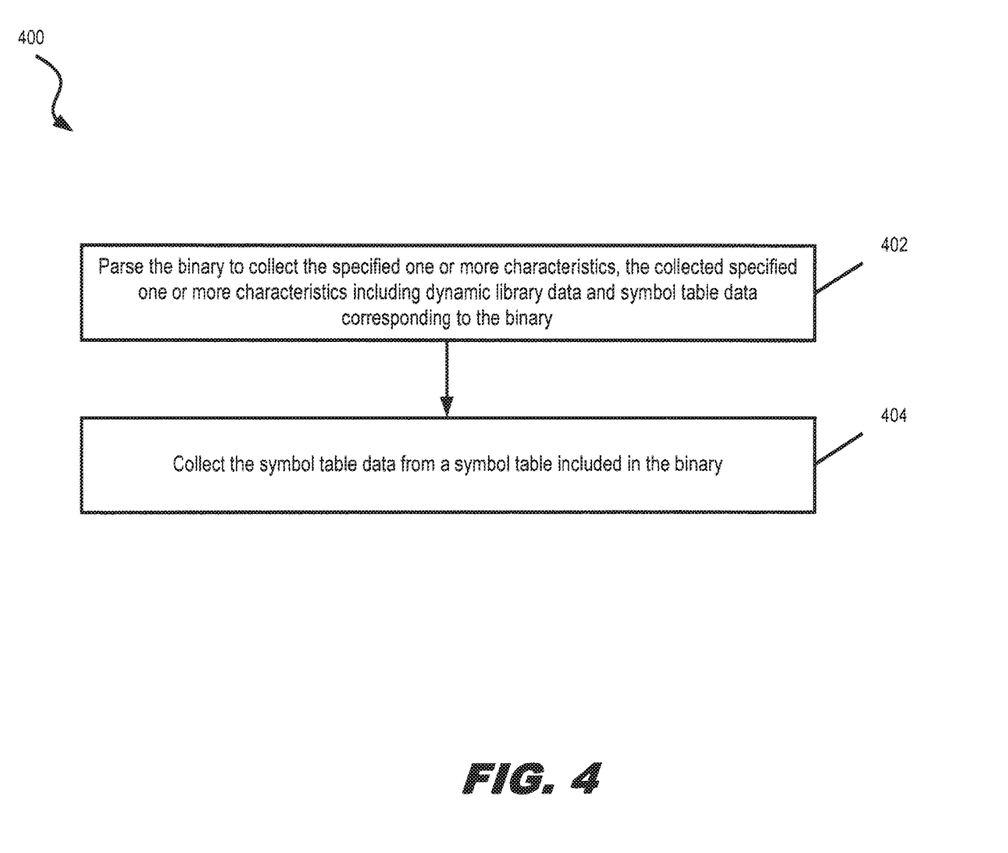
FIG. 4 is a flow diagram illustrating specified characteristics that are collected from a binary by a testing framework, in accordance with various examples of the present disclosure.

FIG. 4 is a flow diagram 400 illustrating specified characteristics that are collected from a binary by a testing framework, in accordance with various examples of the present disclosure. The examples provided regarding FIG. 4 may be performed within the context of the actions 202, 204, 206, 208, and 210 that are performed with respect to FIG. 2. Actions 402 and 404 that is described herein provides further detail and examples regarding actions that may be performed during action 206 that is described with respect to FIG. 2.

At action 402, the testing framework parses the binary to collect specified one or more characteristics. In this example, the collected specified one or more characteristics include dynamic library data and symbol table data corresponding to the binary.

As shown at action 404, the parsing of the binary includes collecting the symbol table data from a symbol table included in the binary. For example, the symbol table may be stored with a particular address space of the binary. In other examples, the symbol table may be collected by reading a symbol table portion of an object file corresponding to the binary that contains the symbol table. That is, the file path of the binary may include a directory with one or more object files or other compiler/linker outputs. The specified characteristics may indicate to access these files corresponding to the binary to determine the additional characteristics. These additional characteristics may be determined as explained in action 208 that is described in further detail with respect to FIG. 2.

Figure 5:
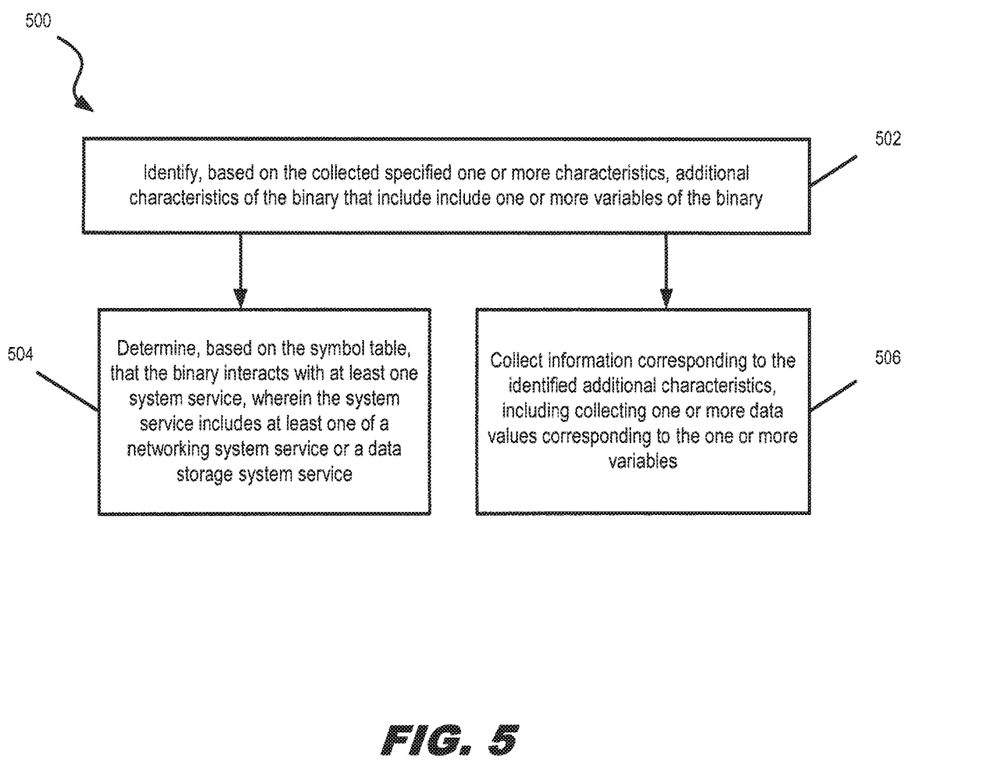
FIG. 5 is a flow diagram illustrating additional characteristics that are collected from a binary by a testing framework, in accordance with various examples of the present disclosure.

FIG. 5 is a flow diagram 500 illustrating additional characteristics that are collected from a binary by a testing framework, in accordance with various examples of the present disclosure. The examples provided regarding FIG. 5 may be performed within the context of the actions 202, 204, 206, 208, and 210 that are performed with respect to FIG. 2. Actions 502, 504, and 506 that is described herein provides further detail and examples regarding actions that may be performed during action 208 that is described with respect to FIG. 2.

At action 502, the testing configuration identifies, based on the collected specified one or more characteristics, additional characteristics of the binary. In the present example, the additional characteristics include one or more variables of the binary that are collected by the testing configuration.

At action 504, the testing configuration determines, based on the symbol table, that the binary interacts with at least one system service, and wherein the system service includes at least one of a networking system service or a data storage system service.

At action 506, the testing configuration collects information corresponding to the identified additional characteristics, including collecting one or more data values corresponding to the one or more variables. In some examples, the collecting of information corresponding to the one or more variables may be done though additional parameterized tests, where the tests are provided by the testing framework and the parameters are provided by the variables.

Figure 6:
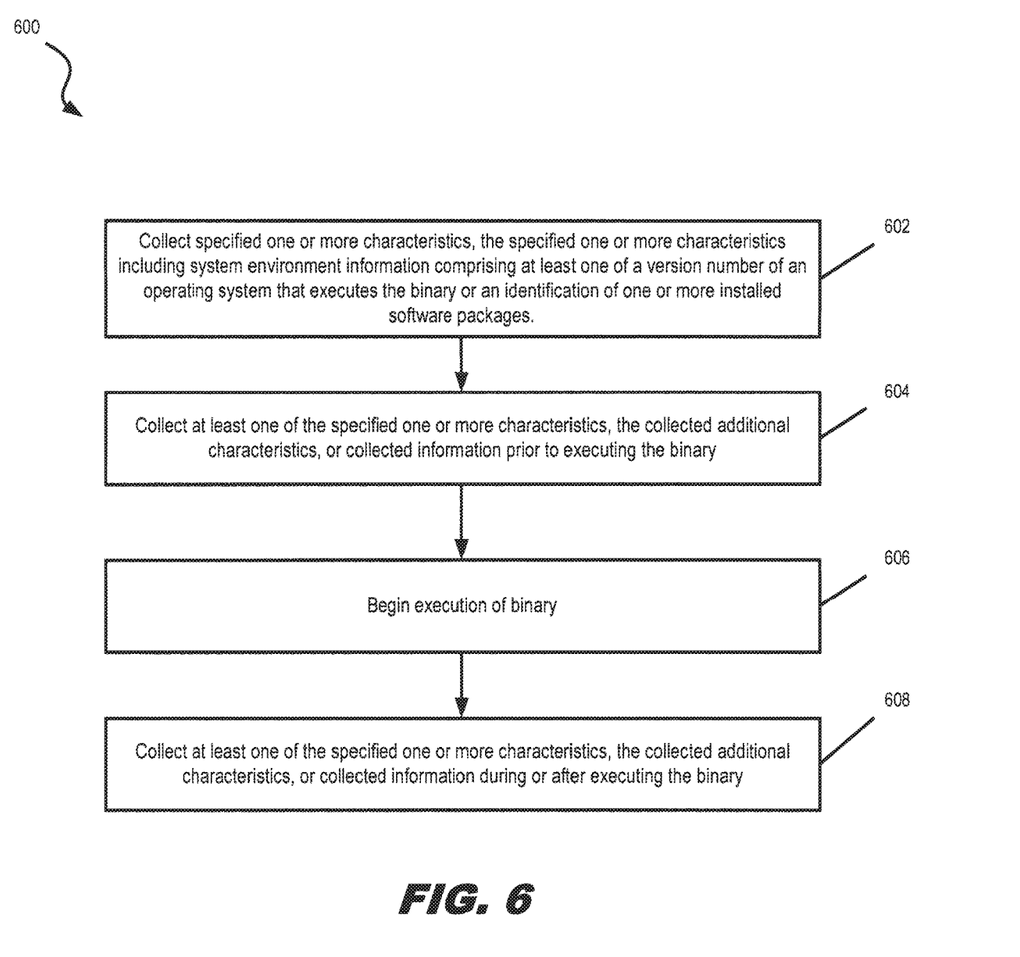
FIG. 6 is a flow diagram illustrating a sequence of characteristics collection before, during, and/or after execution of a binary, where the collected characteristics include system environment information, in accordance with various examples of the present disclosure.

FIG. 6 is a flow diagram 600 illustrating a sequence of characteristics collection before, during, and/or after execution of a binary, where the collected characteristics include system environment information, in accordance with various examples of the present disclosure. The examples provided regarding FIG. 6 may be performed within the context of the actions 202, 204, 206, 208, and 210 that are performed with respect to FIG. 2. Actions 602, 604, 606, and 608 that is described herein provides further detail and examples regarding actions that may be performed during action 210 that is described with respect to FIG. 2.

At action 602, the testing framework collects characteristics, including system environment information comprising at least one of a version number of an operating system that executes the binary or an identification of one or more installed software packages.

At action 604, the testing framework collects at least a portion of the specified one or more characteristics, the collected additional characteristics, or the collected information prior to executing the binary. For example, the testing framework may collect information regarding system services, dynamical libraries, system environment information, and variables prior to executing the binary.

At action 606, the execution of the binary is started. In more detail, a process may be instantiated for the binary. In some examples, the process is instantiated in a debugging mode so that additional information may be collected regarding execution of the binary.

At action 608, the testing framework collects at least a portion of the specified one or more characteristics, the collected additional characteristics, or the collected information during or after the executing binary. For example, characteristics relating to the hardware (e.g., storage and/or networking resources) may be collected during and/or after the binary is executed. In another example, data values of variables may be collected during execution of the binary. In yet other examples, errors may be identified during execution of the binary or after execution of the binary from the binary's exit status. As a result of the collected information, a user may be able to determine particular errors, determine why a particular error or regression occurred, and/or update the binary to make improvements that resolve the error.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure. Although illustrative examples have been shown and described, a wide range of modification, change and substitution is contemplated in the foregoing disclosure and in some instances, some features of the examples may be employed without a corresponding use of other features. In some instances, actions may be performed according to alternative orderings. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method comprising:
inputting, into a testing framework, a path corresponding to a binary;
accessing, by the testing framework, a testing configuration corresponding to the binary, the testing configuration specifying one or more characteristics of the binary for which data collection is enabled;
parsing the binary to collect the specified one or more characteristics, the collected specified one or more characteristics including dynamic library data and symbol table data corresponding to the binary;
identifying, based on the collected specified one or more characteristics, additional characteristics of the binary, wherein at least one of the additional characteristics are used as at least one parameter for at least one test initiated by the testing framework, wherein the identified additional characteristics include one or more variables of the binary and their corresponding data values; and
collecting information corresponding to the identified additional characteristics of the binary, wherein the collected information comprises at least one result of the at least one test initiated by the testing framework.

2. The method of claim 1, wherein the parsing of the binary includes collecting the symbol table data from a symbol table included in the binary.

3. The method of claim 1, wherein the testing configuration includes a global profile that is applied to a plurality of binaries.

4. The method of claim 1, wherein at least one of the collected specified one or more characteristics, the identified additional characteristics, or collected information is collected prior to executing the binary, and
wherein at least one of the collected specified one or more characteristics, the identified additional characteristics, or collected information is collected during or after execution of the binary.

5. The method of claim 1, wherein the specified one or more characteristics include system environment information comprising at least one of a version number of an operating system that executes the binary or an identification of one or more installed software packages.

6. The method of claim 1, wherein identifying the additional characteristics includes determining, based on the symbol table, that the binary interacts with at least one system service, and wherein the system service includes at least one of a networking system service or a data storage system service.

7. The method of claim 1, wherein the collecting of information corresponding to the identified additional characteristics includes collecting one or more data values corresponding to the one or more variables.

8. The method of claim 1, further comprising:
storing the collected information to at least one file.

9. A non-transitory machine-readable medium having stored thereon machine-readable instructions executable to cause a machine to perform operations comprising:
inputting, into a testing framework, a path corresponding to a binary;
accessing, by the testing framework, a testing configuration corresponding to the binary, the testing configuration specifying one or more characteristics of the binary for which data collection is enabled;
parsing the binary to collect the specified one or more characteristics, the collected specified one or more characteristics including dynamic library data and symbol table data corresponding to the binary;
identifying, based on the collected specified one or more characteristics, additional characteristics of the binary, wherein at least one of the additional characteristics are used as at least one parameter for at least one test initiated by the testing framework, wherein the identified additional characteristics include one or more variables of the binary and their corresponding data values; and
collecting information corresponding to the identified additional characteristics of the binary, wherein the collected information comprises at least one result of the at least one test initiated by the testing framework.

10. The non-transitory machine-readable medium of claim 9, wherein the parsing of the binary includes collecting the symbol table data from a symbol table included in the binary.

11. The non-transitory machine-readable medium of claim 9, wherein the testing configuration includes a global profile that is applied to a plurality of binaries.

12. The non-transitory machine-readable medium of claim 9, wherein at least one of the collected specified one or more characteristics, the identified additional characteristics, or collected information is collected prior to executing the binary, and
wherein at least one of the collected specified one or more characteristics, the identified additional characteristics, or collected information is collected during or after execution of the binary.

13. The non-transitory machine-readable medium of claim 9, wherein the specified one or more characteristics include system environment information comprising at least one of a version number of an operating system that executes the binary or an identification of one or more installed software packages.

14. The non-transitory machine-readable medium of claim 9, wherein identifying the additional characteristics includes determining, based on the symbol table, that the binary interacts with at least one system service, and wherein the system service includes at least one of a networking system service or a data storage system service.

15. The non-transitory machine-readable medium of claim 9, wherein the collecting of information corresponding to the identified additional characteristics includes collecting one or more data values corresponding to the one or more variables.

16. The non-transitory machine-readable medium of claim 9, the operations further comprising:
storing, to at least one file, the collected specified one or more characteristics.

17. A computing system comprising:
a non-transitory memory storing a testing framework;
one or more hardware processors coupled to the non-transitory memory and that execute instructions to cause the system to perform operations comprising:
inputting, into the testing framework, a path corresponding to a binary;
accessing, by the testing framework, a testing configuration corresponding to the binary, the testing configuration specifying one or more characteristics of the binary for which data collection is enabled;
parsing the binary to collect the specified one or more characteristics, the collected specified one or more characteristics including dynamic library data and symbol table data corresponding to the binary;
identifying, based on the collected specified one or more characteristics, additional characteristics of the binary, wherein at least one of the additional characteristics are used as at least one parameter for the at least one test initiated by the testing framework, wherein at least one of the additional characteristics are used as at least one parameter for at least one test initiated by the testing framework; and
collecting information corresponding to the identified additional characteristics of the binary, wherein the collected information comprises at least one result of the at least one test initiated by the testing framework.

18. The system of claim 17, wherein the parsing of the binary includes collecting the symbol table data from a symbol table included in the binary.

19. The system of claim 17, wherein the testing configuration includes a global profile that is applied to a plurality of binaries.

20. The system of claim 17, wherein the collecting of information corresponding to the identified additional characteristics includes collecting one or more data values corresponding to the one or more variables.

\* \* \* \* \*